Oct. 15, 1940.　　　B. H. BROWALL　　　2,218,277
OPERATING GEAR FOR AUTOMATIC SLACK ADJUSTERS
Filed May 10, 1939　　　2 Sheets-Sheet 1
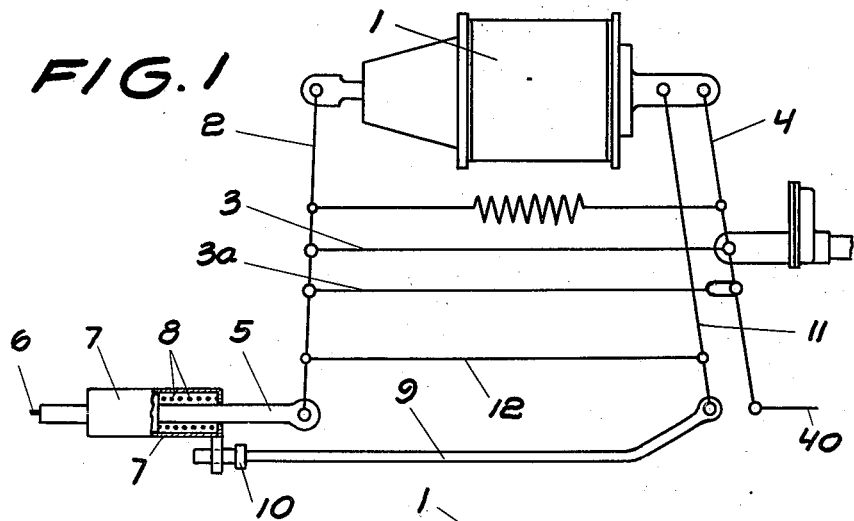
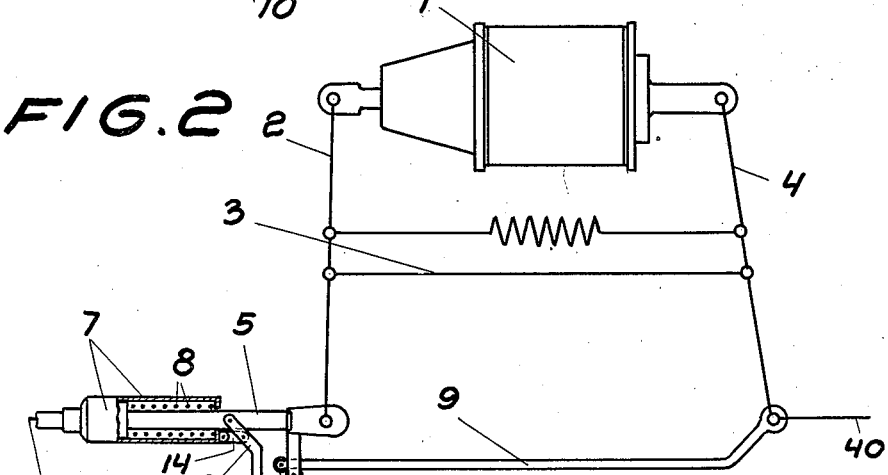
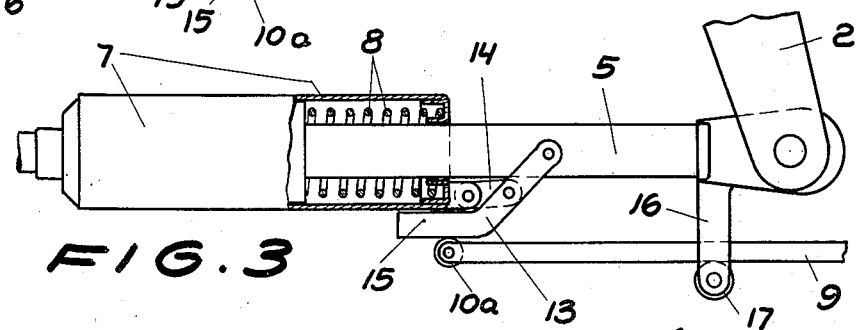
Inventor
B. H. Browall Oct. 15, 1940.  B. H. BROWALL  2,218,277
OPERATING GEAR FOR AUTOMATIC SLACK ADJUSTERS
Filed May 10, 1939  2 Sheets-Sheet 2
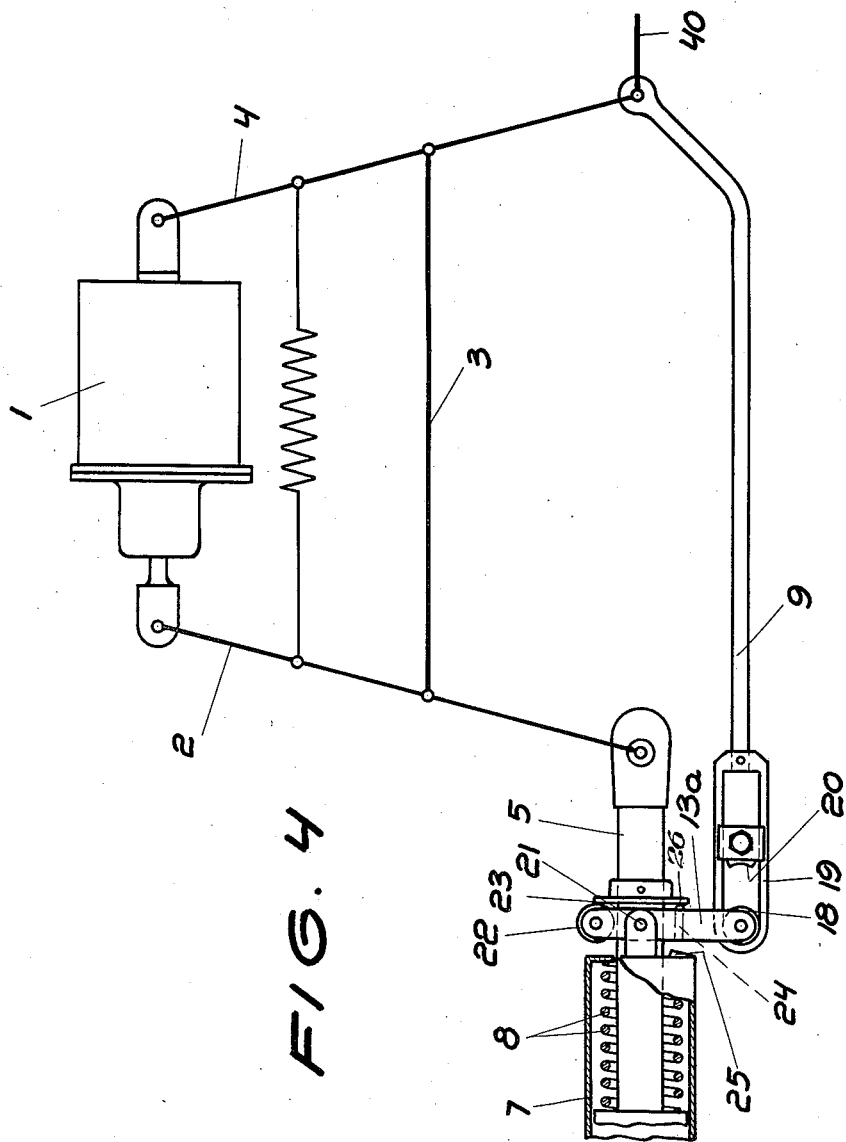

Patented Oct. 15, 1940

2,218,277

UNITED STATES PATENT OFFICE 2,218,277

OPERATING GEAR FOR AUTOMATIC SLACK ADJUSTERS

Bert Henry Browall, Malmo, Sweden, assignor to Svenska Aktiebolaget Bromsregulator, Malmo, Sweden, a corporation of Sweden Application May 10, 1939, Serial No. 272,884
In Germany May 16, 1938

7 Claims. (Cl. 188—198)

This invention relates to slack adjusters for vehicle brakes and more particularly to an operating gear for automatic double-acting slack adjusters of the kind comprising a two-part rod which forms part of the brake rigging and the parts of which are relatively slidable in both directions under the control of means comprising a casing or like member axially movable on one of said rod parts and adapted to be moved against the action of a spring in one direction on said rod part by means operative at the application of the brake and in the other direction by the said spring at the release of the brake. Automatic double-acting slack adjusters of this kind are known, for instance from the U. S. Patents Nos. 2,035,228 and 2,084,989.

In automatic double-acting slack adjusters of the kind herein referred to the said spring must be so strong and of so high an initial tension that it is capable of withstanding, without yielding, the force necessary for overcoming the resistances against the movement of the brake rigging at the application of the brake, even if the brake rigging should be heavy to move, since yielding of the spring before the brake piston has travelled the distance corresponding to the desired brake shoe clearance, would result in a premature blocking of the slack adjuster against paying out slack. Because of the fact, however, that in automatic double-acting slack adjusters of the kind herein referred to the said spring will be compressed more or less at each braking operation by the action of the operating gear, the necessary considerable force required for effecting the compression of said strong spring materially disturbs the brake action, especially at the beginning of the development of the brake pressure, since said force is delivered by and, consequently, reacts on the brake piston and thus reduces the brake pressure.

An object of the invention is to provide an operating gear for automatic double-acting slack adjusters of the kind herein referred to, by which the use of a relatively strong spring is permitted and its drawbacks are reduced.

The invention possesses further objects and features of advantages, some of which, with the foregoing, will be set forth in the following description of some forms of the invention which are illustrated in the accompanying drawings forming part of this specification. I wish it to be understood, however, that the invention is not limited to the showing made by said drawings and description, as variations of these forms may be adopted within the scope of the invention as set forth in the appended claims.

Referring to said drawings:

Fig. 1 is a diagrammatic and fragmental plan view of a brake arrangement including an automatic double-acting slack adjuster and an operating gear therefor according to one form of the invention, the slack adjuster being shown partly in section and the parts being in the position corresponding to released brake.

Fig. 2 is a similar view illustrating a second form of the invention.

Fig. 3 is a detail view on a larger scale of certain parts of the form of Fig. 2 in a position at application of the brake.

Fig. 4 is a view similar to Figs. 1 and 2, illustrating a third form of the invention.

Referring first to Fig. 1 on the drawings, 1 designates the brake cylinder and 2 the live brake lever, which by means of a number of tie rods 3 and 3a, which can be rendered operative selectively, is connected to the dead brake lever 4. Brake pull rods are connected to the free ends of the brake levers 2 and 4 and extend towards the opposite ends of the vehicle on which the brake is used. The automatic double-acting slack adjuster, which comprises a two-part rod, the parts 5 and 6 of which are relatively slidable in both directions, is connected in, or constitutes, the brake pull rod connected to the live lever 2. The brake pull rod connected to the dead brake lever 4 is designated 40. Since the automatic double-acting slack adjuster of the kind herein referred to may be of any known or suitable construction incorporating the means enumerated above it is illustrated and described herein only to the extent necessary for the understanding of the nature of the present invention, which relates exclusively to the means for operating the slack adjuster. When the slack adjuster is described as being double-acting this means that it is capable not only of automatically reducing the slack when too large but also of automatically increasing the slack when too small. The function of the double-acting slack adjuster of the kind herein referred to for these two purposes is known in the art and, therefore, shall not be described herein, reference being made for instance to the prior U. S. patents hereinbefore mentioned. To the extent shown the automatic double-acting slack adjuster comprises the two relatively slidable rod parts 5 and 6, a casing 7 slidable in both directions on the rod part 5, and a strong compression spring 8 acting between said rod 5 and said casing 7 and tending to move the latter axially on rod 5 to the right in the figure. The casing 7 is for carrying means (not shown) for controlling the relative axial movements of rod parts 5 and 6 in both directions in dependence upon movement of the casing 7 to the left in the figure at application and to the right in the figure at release of the brake. The movement in the first direction is imparted to the casing 7 at the application of the brake by an operating gear forming the subject matter of the present invention, the spring 8 being compressed at this movement. The return movement of the casing 7 at release of the brake is effected by the tensioned spring 8.

As far as now described the brake arrangement is known and does not require further explanation to be understood by those skilled in the art. Previously, however, it was the usual practice to operate the casing 7 by means of an abutment on a rod connected to the free end of the dead brake lever 4 so that, at application of the brake, the casing 7 was moved at a rate equal to the rate of the relative movement of the free ends of the brake levers 2 and 4, which latter rate of movement depends upon the leverage ratio determined by the operative tie rod 3 or 3a.

According to the invention an operating gear for operating the casing 7 is provided, by which, at application of the brake, the casing 7 is moved at a rate substantially lower than that of the relative movement of the free ends of the brake levers 2 and 4. By moving the casing 7 at such a reduced rate the advantage is gained that the resistance which the brake power encounters in compressing the strong spring 8 is correspondingly reduced, whereby the disturbance of the brake action, caused by the spring at the compression thereof, also is correspondingly reduced.

According to the form of the invention illustrated in Fig. 1 the operating gear comprises the usual operating rod 9 having the abutment 10, said rod 9, however, not being connected to the dead brake lever 4 but to an additional lever 11 which, similarly to the dead brake lever 4, has one end pivoted at a fixed point substantially on the axis of the brake cylinder 1, but which is tied to the live brake lever 2 by a tie rod 12 determining a much higher leverage ratio of the lever 11 than the leverage ratio of the dead brake lever determined by any of the tie rods 3 and 3a.

This form of the invention is especially applicable to empty and load brakes that can be set on either of a number of different brake applying leverages determined by a corresponding number of tie rods such as 3 and 3a which can be rendered operative selectively either manually or automatically in dependence upon the load of the vehicle. Due to the reduced rate of movement of the operating rod 9 being determined by the additional lever 11 and independent of the operative brake tie rod 3 or 3a, the casing 7 will be moved at the same rate independently of changes of the brake applying leverage.

In the form of the invention illustrated in Figs. 2 and 3 the length of the movement that can be imparted to the casing 7 by the operating gear at application of the brake is limited. In this form of the invention the operating rod 9 is connected to the free end of the dead brake lever 4. In order to reduce the rate of movement of the casing 7 on rod 5 in relation to the rate of movement of the free ends of the brake levers 2 and 4 at the application of the brake the movement of rod 9 is transmitted to the casing 7 by a lever 13 pivoted at one end to the rod 5 and linked to the casing 7 by means of a link 14 (see Fig. 3). The operating rod 9 at its free end is provided with an abutment 10a, preferably in the form of a roller, for coaction with the free end portion 15 of the lever 13, said end portion 15 of the lever 13 preferably being angularly offset as shown or otherwise enabling the rod 9 to pass the lever 13 after having rotated it through a certain angle as shown in Fig. 3. At this limited rotation of the lever 13 by the operating rod 9 the casing 7 is moved against the action of the spring 8 at a rate substantially lower than that of the relative movement of the free ends of the brake levers 2 and 4. In this form of the invention it is possible to limit the movement of the casing 7 against the action of the spring 8 to any desired small value by varying the shape or arrangement of the lever 13. For guiding the operating rod 9 in relation to the rod 5 the latter may be provided with a bifurcated arm 16 through which the rod 9 projects, a guiding roller 17 preferably being provided at the end of said arm.

Obviously the reduced rate of movement of the casing 7 on the rod 5 at the application of the brake results in a reduction of the amount of this movement of the casing 7 and thereby of the amount by which the slack adjuster is capable of reducing excessive slack at each release of the brake. This reduction of the slack reducing capacity of the slack adjuster, however, is of no importance in respect of the normal slack reducing function of the slack adjuster, which is to compensate for the wear of the brake shoes, since this wear is slow and well compensable by the slack adjuster in spite of the reduced slack reducing capacity thereof. It may happen, however, that a larger increase of the slack occurs, for instance if one or more brake shoes should be broken and fall off. It may be that when such a larger increase of the slack occurs the reduced slack reducing capacity of the slack adjuster is insufficient for enabling the slack adjuster to reduce the excessive slack to a normal value at the release of the brake following the first application thereof, so that a number of application and release movements of the brake are required for reducing the excessive slack to the desired value. It is desirable, however, that the slack adjuster shall be capable of reducing the slack, even if rather much too large, to a normal value at the release of the brake following the first application thereof.

The form of the invention illustrated in Fig. 4 meets this desire and, nevertheless, maintains the advantage of a reduced rate of movement of the casing 7 on the rod 5 at the normal slack reducing function of the slack adjuster for compensating the wear of the brake shoes. In this form of the invention the movement of the operating rod 9 which is linked to the free end of the dead brake lever 4 is transmitted to the casing 7 at a reduced rate by means of a lever 13a provided at one end with a roller 18 or the like engaging a longish eye 19 at the free end of the rod 9, said eye being provided with an adjustable abutment 20 for coaction with the roller 18. The lever 13a is pivoted at 21 to the casing 7 and is provided at its other end with a roller 22 or the like for coaction with an abutment flange 23 or the like secured on the rod part 5. Between the pivot 21 and the roller 18 the lever 13a is provided with an abutment 24 for coaction with an abutment 25 on the casing 7.

The abutment 20 is adjusted so that it at the application of the brake, when the brake piston has travelled a certain distance corresponding to the desired value of the slack, reaches the roller 18 and then rotates the lever 13a. At this rotation of the lever 13a the roller 22 supports itself against the flange 23, and the casing 7 is moved to the left on rod 5 against the action of the spring 8 at a lower rate than that of the relative movement of the free ends of the brake levers 2 and 4. If the brake piston travels a sufficient distance for moving the lever 13a with its abutment 24 in contact with the abutment 25 on the casing 7 and then continues its forward movement the casing 7 is moved further to the left on the rod 5 and now at a rate equal to that of the relative movement of the free ends of the brake levers 2 and 4. The possible angle of rotation of the lever 13a until its abutment 24 reaches the abutment 25 on the casing 7 is of an order sufficient for the normal slack reducing function of the slack adjuster, that is for compensating the wear of the brake shoes, so that the casing 7 is moved on rod 5 against the action of the spring 8 at the reduced rate defined by the leverage ratio of the lever 13a at such normal function of the slack adjuster, the abutment 24 of the lever 13a becoming active for causing an additional movement of the casing 7 at a rate equal to that of the relative movement of the free ends of the brake levers only when occasionally a larger increase of the slack has occurred.

A further advantage of the form of the invention illustrated in Fig. 4 resides in the fact that, towards the end of the release movement of the brake, a displacement of the casing 7 on rod 5 against the action of spring 8, sufficient for causing the slack adjuster to lock itself against such slack increasing movements as otherwise may occur at released brake under the action of forces of inertia produced for instance by shocks when switching the cars, is obtainable simply by making the arrangement such that the lever at the end of the release movement of the brake is caused to support itself against the flange 23 at a point between the pivot 21 and the roller 18. For this purpose the abutment 24 may be so arranged that it can coact also with the flange 23 as shown at 26.

What I claim and desire to secure by Letters Patent is:—

1. In a vehicle brake comprising a brake actuator, interconnected brake levers relatively movable by said brake actuator, brake pull rods connected to said brake levers, one of said brake pull rods including an automatic double-acting slack adjuster of the character described, comprising two rod parts relatively slidable in both directions, a member axially movable on one of said rod parts and adapted to be moved thereon in one direction at application and in the other direction at release of the brake, and a strong spring acting between said movable member and said rod part in said last mentioned direction, an operating gear utilizing the relative movement of said brake levers at application of the brake for effecting the movement of said movable member on said rod part in said first mentioned direction and including a lever for reducing the said movement imparted to said movable member to a rate substantially lower than that of the relative movement imparted to said brake pull rods by said brake levers.

2. In a vehicle brake comprising a brake actuator, a live brake lever movable by said brake actuator, a dead brake lever connected to said live brake lever, brake pull rods connected to said live and dead brake levers, an automatic double-acting slack adjuster of the character set forth, forming part of said brake pull rod of said live brake lever and comprising two rod parts relatively slidable in both directions, a member axially movable on one of said rod parts and adapted to be moved in relation thereto in one direction at application and in the other direction at release of the brake, and a strong spring acting between said movable member and said rod part in said last mentioned direction, an operating gear for effecting the movement of said movable member in relation to said rod part in said first mentioned direction, comprising an additional lever arranged and connected to said live brake lever similarly to said dead brake lever but for being divided, by its connection to said live brake lever, into a leverage ratio substantially higher than that of said dead brake lever, an operating rod connected to said additional lever, and an abutment on said operating rod for coaction with said movable member.

3. In a vehicle brake comprising a brake actuator, interconnected brake levers relatively movable by said brake actuator, brake pull rods connected to said brake levers, an automatic double-acting slack adjuster of the character set forth, forming part of one of said brake pull rods and comprising two rod parts relatively movable in both directions, a member axially movable on one of said rod parts and adapted to be moved in relation thereto in one direction at application and in the other direction at release of the brake, and a strong spring acting between said movable member and said rod part in said last mentioned direction, an operating gear for effecting the movement of said movable member in said first mentioned direction at application of the brake, comprising a lever operatively connected to one of said brake levers and, when active, transmitting the movement of said brake lever in relation to the other brake lever to said movable member in relation to said rod part at a rate substantially lower than that of the relative movement imparted to said brake pull rods by said brake levers.

4. In a vehicle brake comprising a brake actuator, interconnected brake levers relatively movable by said actuator, brake pull rods connected to said brake levers, an automatic double-acting slack adjuster of the character described, forming part of the brake pull rod of one of said brake levers and comprising two rod parts longitudinally movable in relation to each other in both directions, a member movable on one of said rod parts and adapted to be moved in one direction at application and in the other direction at release of the brake, and a strong spring acting between said movable member and said rod part in said last mentioned direction, an operating gear for effecting the movement of said movable member in said first mentioned direction against the action of said strong spring at application of the brake, comprising an operating rod connected to the other of said brake levers, and a lever operable by said operating rod for transmitting the movement thereof to said movable member at a reduced rate.

5. An operating gear as claimed in claim 4, in which the lever operable by the operating rod is pivoted to said rod part and linked to said movable member and so arranged that it, by being rotated through a limited angle by the operating rod, permits the latter to continue its movement without further rotating the lever.

6. An operating gear as claimed in claim 4, in which the lever operable by the operating rod is pivoted on said movable member and is rotatable by said operating rod through a limited angle and arranged, during this limited rotation, to coact with an abutment on said rod part, so as to transmit the movement of said operating rod to said movable member at a reduced rate, and then, should the operating rod be moved further, to coact with an abutment on said movable member for taking the latter along in such further movement of said operating rod at the full rate thereof.

7. An operating gear as claimed in claim 4, in which the lever operable by said operating rod is pivoted on said movable member and in which said rod part is provided with abutment means for said operating lever to support itself against at both sides of the pivot thereof.

BERT HENRY BROWALL.